(12) United States Patent
Van Den Berk et al.

(10) Patent No.: US 9,884,720 B2
(45) Date of Patent: Feb. 6, 2018

(54) SYSTEM FOR STORING PRODUCT CONTAINERS

(71) Applicant: Vanderlande Industries B.V., Veghel (NL)

(72) Inventors: Franciscus Maria Van Den Berk, Veghel (NL); Jan Jeroen Boonstra, Veghel (NL); Michael Nema, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 15/326,227

(22) PCT Filed: Jul. 15, 2015

(86) PCT No.: PCT/NL2015/050520
§ 371 (c)(1),
(2) Date: Jan. 13, 2017

(87) PCT Pub. No.: WO2016/010429
PCT Pub. Date: Jan. 21, 2016

(65) Prior Publication Data
US 2017/0210562 A1 Jul. 27, 2017

(30) Foreign Application Priority Data
Jul. 16, 2014 (NL) ..................... 2013200

(51) Int. Cl.
*B65G 1/04* (2006.01)
*B65G 1/06* (2006.01)

(52) U.S. Cl.
CPC ............... *B65G 1/0492* (2013.01)

(58) Field of Classification Search
CPC ............... B65G 1/026; B65G 1/0492
USPC .............. 414/240, 241, 279; 198/463.3
See application file for complete search history.

(56) References Cited

U.S. PATENT DOCUMENTS

| | | | | |
|---|---|---|---|---|
| 4,273,494 A | * | 6/1981 | Swain | B65G 1/0414 414/266 |
| 4,395,181 A | * | 7/1983 | Loomer | B65G 1/0414 254/4 B |
| 4,657,463 A | * | 4/1987 | Pipes | B62D 1/24 180/167 |
| 5,370,492 A | * | 12/1994 | Gleyze | B65G 1/0492 414/279 |
| 5,658,120 A | * | 8/1997 | Watanabe | B23Q 7/1436 280/781 |

(Continued)

FOREIGN PATENT DOCUMENTS

FR 2730715 A1 8/1996
WO 2005077789 A1 8/2005

OTHER PUBLICATIONS

International Search Report and Written Opinion of corresponding International Application No. PCT/NL2015/050520; dated Sep. 12, 2015; 10 pages.

*Primary Examiner* — Douglas A Hess
(74) *Attorney, Agent, or Firm* — Shumaker, Loop & Kendrick, LLP (57) ABSTRACT

A system for storing product containers including racks, a guide system having longitudinal guides and transverse guides extending between adjacent rows of the racks, and trolleys that can move along the guide system.

19 Claims, 4 Drawing Sheets

(56) References Cited

U.S. PATENT DOCUMENTS

| | | | | |
|---|---|---|---|---|
| 6,042,321 A * | 3/2000 | Labell | ............... | B65G 1/0414 |
| | | | | 414/276 |
| 6,104,314 A * | 8/2000 | Jiang | ............... | B60Q 9/004 |
| | | | | 340/436 |
| 6,652,213 B1 * | 11/2003 | Mitchell | ............... | B65G 1/0492 |
| | | | | 414/279 |
| 7,128,521 B2 * | 10/2006 | Hansl | ............... | B65G 1/0435 |
| | | | | 414/807 |
| 7,591,630 B2 * | 9/2009 | Lert, Jr. | ............... | B65G 1/0492 |
| | | | | 414/279 |
| 7,784,407 B2 * | 8/2010 | Di Rosa | ............... | B65G 1/0414 |
| | | | | 104/48 |
| 8,690,510 B1 * | 4/2014 | Razumov | ............... | B65G 1/0492 |
| | | | | 108/144.11 |
| 8,694,152 B2 * | 4/2014 | Cyrulik | ............... | B65G 1/0492 |
| | | | | 700/214 |
| 8,696,010 B2 * | 4/2014 | Toebes | ............... | B65G 13/00 |
| | | | | 280/400 |
| 8,721,250 B2 * | 5/2014 | Razumov | ............... | B65G 1/0492 |
| | | | | 108/144.11 |
| 9,334,114 B2 * | 5/2016 | Salichs | ............... | B65G 1/026 |
| 9,422,108 B2 * | 8/2016 | Hognaland | ............... | B65G 1/0464 |
| 9,499,339 B2 * | 11/2016 | Roberto | ............... | B65G 1/0492 |
| 9,694,975 B2 * | 7/2017 | Lert | ............... | B65G 1/0492 |
| 9,701,473 B2 * | 7/2017 | Warries | ............... | B65G 1/0492 |
| 9,725,239 B2 * | 8/2017 | Lert | ............... | B65G 1/0492 |
| 9,764,899 B2 * | 9/2017 | Van Den Berk | ............... | B65G 1/0492 |
| 9,771,217 B2 * | 9/2017 | Lert | ............... | B65G 1/0492 |
| 2005/0047895 A1 * | 3/2005 | Lert, Jr. | | |
| 2011/0008138 A1 * | 1/2011 | Yamashita | | |
| 2012/0259482 A1 * | 10/2012 | Jeschke | | |
| 2014/0086714 A1 | 3/2014 | Malik | | |

* cited by examiner

SYSTEM FOR STORING PRODUCT CONTAINERS

TECHNICAL FIELD AND BACKGROUND OF THE INVENTION

The present invention relates to a system for storing product containers.

US publication U.S. Pat. No. 5,370,492 discloses a storage system comprising a plurality of parallel racks, each rack comprising superimposed rows of side-by-side storage positions for product containers, as well as a guide system comprising horizontal longitudinal guides extending between rows of adjacent racks and horizontal transverse guides extending in transverse direction, transversely to the longitudinal guides. Trolleys can move from one longitudinal guide to another longitudinal guide within a layer of rows via a transverse guide, so that each trolley can be efficiently deployed for exchanging product containers with storage positions, irrespective of the row of which a respective storage positions forms part. Inevitably, there will be junctions, either crossings or T-junctions, between the longitudinal guides and the transverse guides, where a trolley can change its direction of movement at right angles without this causing a change in the orientation of the trolley. Each trolley is for that purpose provided both with longitudinal running wheels and with transverse running wheels. The vertical adjustment means enable the trolley either to have the longitudinal running wheels make contact with the longitudinal guides, in which case the transverse running wheels will be clear of the transverse guides, or to have the transverse running wheels make contact with the transverse guides, in which case the longitudinal running wheels will be clear of the longitudinal guides. The longitudinal guides comprise two opposite parallel longitudinal guide members and the transverse guides comprise two opposite parallel transverse guide members. The two longitudinal guide members of the longitudinal guides comprise C-shaped sections, with the open sides of the C-shape of respective longitudinal guide members forming a pair facing each other. The longitudinal running surface is formed by the lower horizontal leg of the C-shape. Each trolley is provided with eight longitudinal running wheels and eight transverse running wheels. Apart from the fact that this adds to the complexity and cost of the trolleys, the relatively large number of longitudinal running wheels and transverse running wheels has the drawback that vibrations will more easily occur in the trolley, so that there will be an increased risk of a product container falling off the trolley. Furthermore, the vibrations lead to undesirable noise and an additional mechanical load, and thus to wear on the trolleys. Within the framework of the ongoing effort to realise a more efficient use of a system as described in the introductory paragraph, there is a constant demand for faster-moving cars, which increases the above-described problem. Furthermore it is desirable that the installation height of the guide system is small so as to be able to utilize the overall height of the system in an efficient manner, and in addition it is desirable for the system to be constructionally simple, so that the cost price will remain within bounds, and in addition the configuration of the guide system preferably makes it possible to use a relatively simple embodiment of the trolleys that are used. Furthermore, the system must be safe in use, which implies, among other things, that derailing of the trolleys must be prevented. The above wishes and requirements are in many cases contradictory.

The object of the present invention is to provide the system as described in the introductory paragraph which, whether or not in preferred embodiments thereof, meets the various requirements mentioned in the foregoing. In order to achieve that object, a system according to claim 1 is provided. The significant advantage obtained with the system according to the invention is that the maximum height of the trolley in the transverse position thereof can remain within bounds. Thanks to this advantage the total height of the system is reduced, without this being realised at the expense of the other requirements as mentioned above. More specifically, the total height of the trolley in question in the transverse position thereof only needs to be slightly higher than the total height of the trolley in question in the longitudinal position, and in any case less higher than the height of the transverse guide members or at least than the highest of the transverse guide members and a longitudinal guide members.

BRIEF SUMMARY OF THE INVENTION

According to an advantageous embodiment, the longitudinal guide surfaces comprise recesses at the aforesaid longitudinal positions at the upper sides of the longitudinal guide surfaces, through which, in the transverse position of the vertical adjustment means, lower parts of the longitudinal running wheels move upon movement of the trolley in the transverse direction. The use of the recesses in the longitudinal guide surfaces makes it possible to give the longitudinal guide surfaces a height over the larger part of their length which for example equals the height of the transverse guide members, and which in any case is greater than the height of the longitudinal guide surfaces at the aforesaid longitudinal positions of the longitudinal running wheels. As a result, the longitudinal guide members can be configured to have a relatively high stiffness in spite of the lower height of the longitudinal guide surfaces at the location of the aforesaid longitudinal positions of the longitudinal running wheels.

The effect achieved if the bottom sides of the recesses are located higher than the bottom side of the at least one guide member in the longitudinal position of the vertical adjustment means is that on the one hand guiding contact takes place or at least can take place between the guide member and the respective longitudinal guide surfaces upon movement of the trolley in longitudinal direction, also if the at least one guide member extends along the recesses, whilst on the other hand the longitudinal guide surfaces also form a blockage for the longitudinal running wheels if, due to unforeseen circumstances, the trolley should nevertheless exhibit a tendency to move in the transverse direction in the longitudinal position thereof.

An advantageous guidance by the guide members can be obtained if each longitudinal guide member comprises longitudinal guide surfaces on opposite sides of the longitudinal running surface.

Each longitudinal guide member can in that case advantageously have a simple configuration if the longitudinal guide surfaces and the longitudinal running surface of each longitudinal guide member define a U-shaped cross-section, in any case along part of the length of the longitudinal guide members, preferably along the greater part of the length of the longitudinal guide member. In fact, the longitudinal guide members may be configured as U-shaped sections in that case. Within the scope of the present preferred embodiment it is, incidentally, not necessary for the two upright legs of the U-shaped to have the same height.

According to further advantageous embodiments, at least one transverse guide member of each pair of transverse guide members comprises at least one transverse guide surface, wherein at least one guide member of a trolley guidingly cooperates with the at least one transverse guide surface upon movement of the trolley in transverse direction. Furthermore preferably, all transverse guide members each comprise two opposite transverse guide surfaces.

For reasons of constructional simplicity it is advantageous if all the guide members of each trolley are provided only at corners of the trolley, being capable of guiding cooperation both with longitudinal guide surfaces and with transverse guide surfaces. The invention makes it possible to realise such a constructionally simple trolley.

A good guidance can be obtained if each trolley is provided with no more than and no fewer than three guide members.

In particular if exactly three guide members are used, it is preferable if a first guide member is connected to the frame via a first spring member and a second guide member is connected to the frame via a second spring member, wherein the first spring member and the second spring member are configured to act in two directions oriented perpendicular to each other, wherein furthermore preferably the first guide member and the second guide member are connected to the frame at opposite corner points of the trolley and/or a third guide member is rigidly connected to the frame. In this way relatively large tolerances can be used as regards the distance between and the parallelism of opposite (longitudinal or transverse) guide members.

In the longitudinal position, the bottom sides of the transverse running wheels are preferably located higher than the upper sides of the transverse guide surfaces, wherein the upper sides of the transverse running wheels are located lower than the upper side of the associated trolley. This preferred embodiment is based on the understanding that the position of the transverse running wheels is not a determining factor as regards the maximum height the trolley can have, so that in contrast to the longitudinal guide surfaces there is no advantage to be gained in providing recesses in the upper sides of the transverse guide surfaces.

For reasons of constructional simplicity it is furthermore preferable it is moreover preferable if each trolley comprises no more than and no fewer than four longitudinal running wheels and/or no more than and no fewer than four transverse running wheels.

A constructionally simple embodiment can further be obtained if the longitudinal running wheels are rotatably connected to the frame at a fixed position, whilst the transverse running wheels are rotatably connected to at least one subframe that can be moved up and down relative to the frame by the vertical adjustment means.

The trolleys may be of relatively simple construction if the driving means are configured to drive the drivable longitudinal running wheels and the drivable transverse running wheels simultaneously. This implies that, in use, running wheels, insofar as they are driven running wheels, which are not in contact with an underlying running surface, nevertheless rotate upon movement of the trolley.

In general it is true that it is helpful in achieving constructional simplicity of the trolley if the driving means comprise a single electric motor for driving both the drivable longitudinal running wheels and the drivable transverse running wheels and/or if the driving means comprise a single electric motor configured both for driving drivable longitudinal running wheels and/or drivable transverse running wheels and for driving the vertical adjustment means and/or if the driving means comprise a single electric motor configured both for driving drivable longitudinal running wheels and/or drivable transverse running wheels and for driving the exchange means.

The invention further provides a combination of a guide system and at least one trolley for use in a system according to the invention as explained in the foregoing.

BRIEF DESCRIPTION OF THE DRAWINGS

The invention will now be explained by means of a possible embodiment of a system according to the invention and with reference to the following figures.

DETAILED DESCRIPTION OF THE INVENTION

Figure 1:
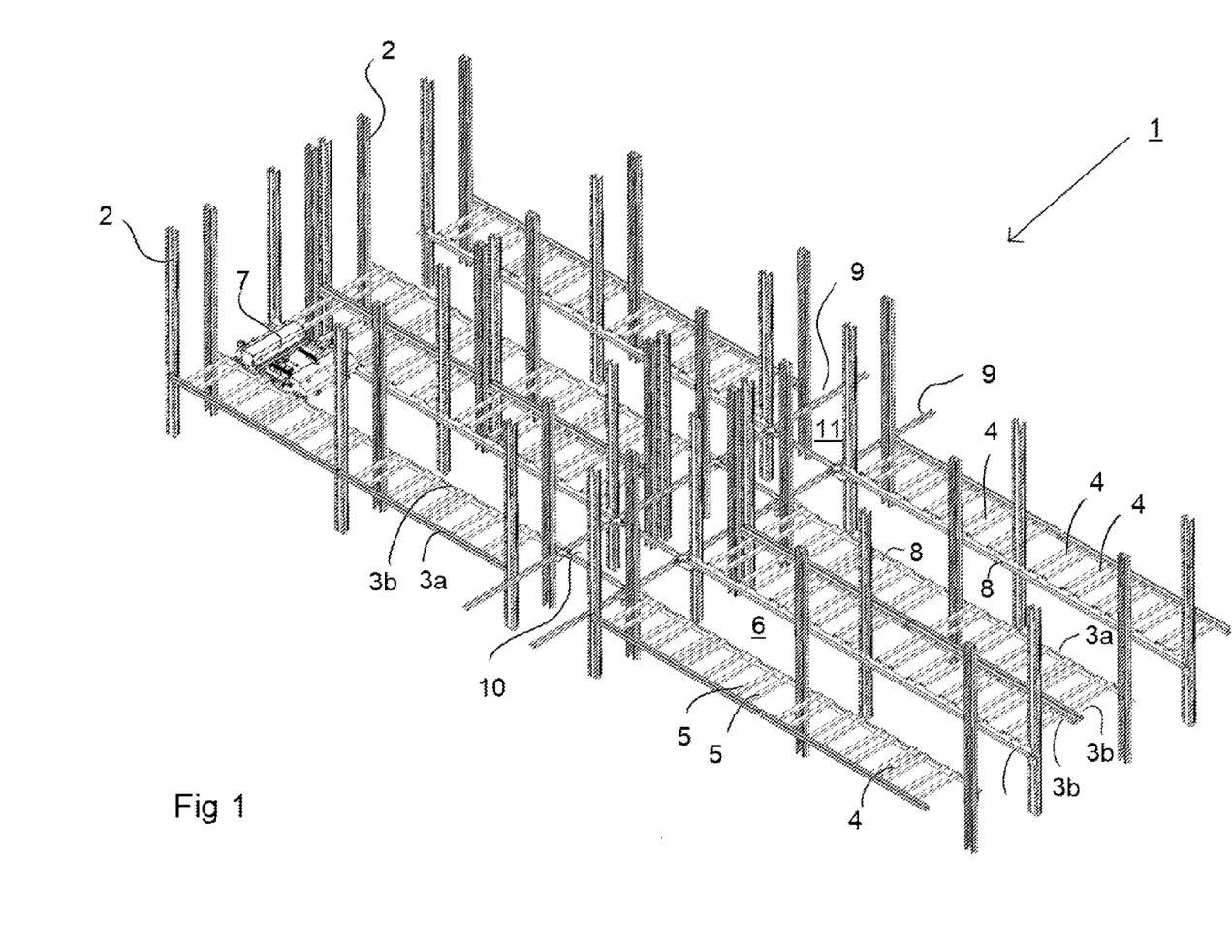
FIG. 1 is an isometric top plan view of a part of a system according to the invention.

The storage system 1 of FIG. 1 comprises a system of racks with uprights 2 and longitudinal girders 3a, 3b. The racks comprise storage positions 4, which are provided in parallel rows. Each storage position comprises two support elements 5, which are mounted between two longitudinal girders 3a, 3b, which are in turn mounted between two uprights 2. The support elements 5 are configured to support a product container, for example a product bin in which identical products are stored.

For the sake of clarity only a part of the storage system 1 is shown in FIG. 1. Thus, the storage system in fact comprises a number of superimposed layers, each layer comprising rows of storage positions 4. In FIG. 1 only one layer comprising a limited number of rows is shown, however. In practice the length of the rows may moreover be greater than shown.

Figure 2A:
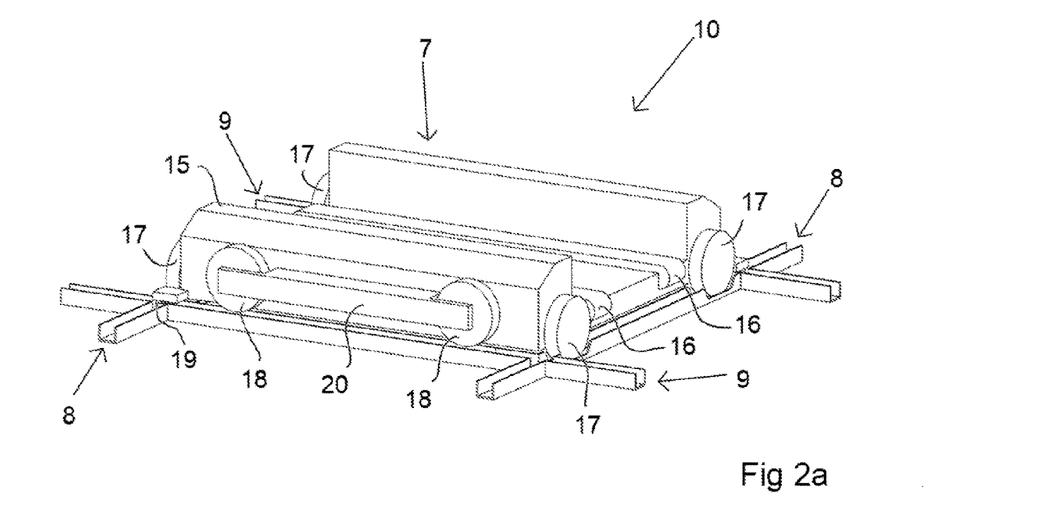
FIGS. 2a and 2b are isometric top plan views showing a crossing in the system according to FIG. 1, including a trolley, which trolley is shown in the longitudinal position and in the transverse position, respectively.
Figure 2B:
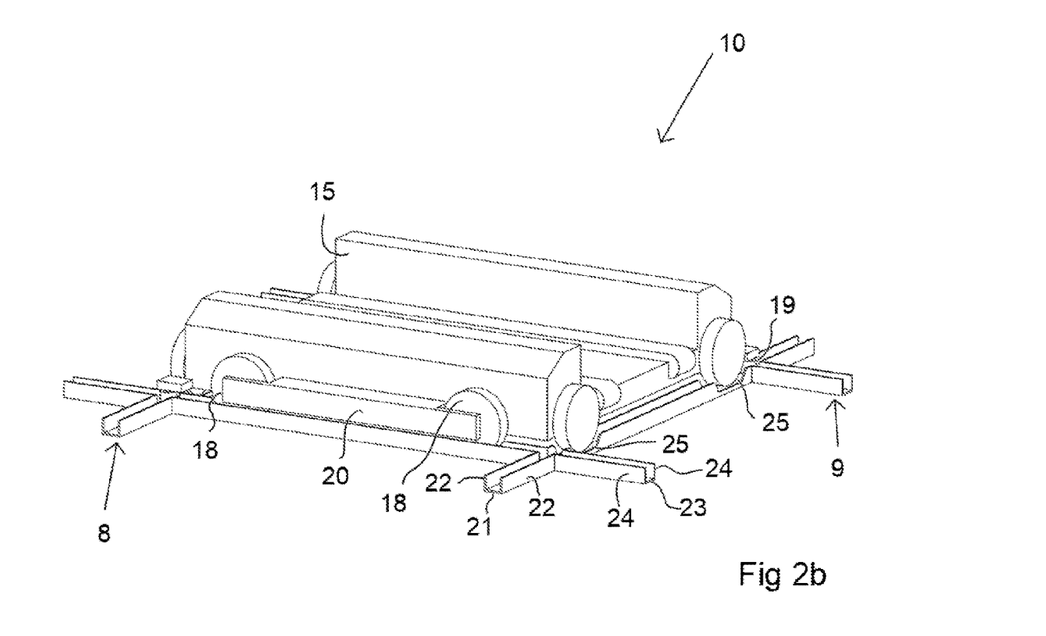

The rows of storage positions 4 are provided in pairs, with an aisle 6 present between the rows of a pair, in which a trolley 7 (yet to be discussed) is movable in longitudinal direction. Longitudinal guides, each comprising two longitudinal guide members 8, which are connected to the longitudinal girders 3a, are for that purpose provided between the two rows of a pair. Transverse guides comprising pairs of transverse guide members 9 extend transversely between the longitudinal guide members 8 on every layer, which transverse guides join one another at the location of junctions, such as the crossing 10 (see also FIGS. 2a and 2b). The rows of storage positions 4 are interrupted at the location of the transverse guide members 9, so that an aisle 11 extending in transverse direction is formed. The transverse guide members 9 are mounted to uprights 2. Although this is shown in FIG. 2, transverse guides extend also at the short ends of the racks. At that location, too, the transverse guides and the longitudinal guides join one another, so that the junctions are T-junctions.

The trolley 7 can move in the longitudinal direction along the longitudinal guides 8 in the so-called longitudinal position of the trolley 7 and in the transverse direction along the transverse guides 9 in the so-called transverse position of the trolley 7. The trolleys 7 can be transported between the various layers by means of lifts (not shown). Such lifts are preferably positioned in line with longitudinal guides or transverse guides.

FIGS. 2*a* and 2*b* show a trolley 7 at the location of a crossing 10. The trolleys 7 are provided with a base frame 15 and with exchange means, among other elements. The exchange means comprise two parallel arms with drivable endless conveyor belts 16. The arms can move forward and backward in transverse direction on either side of the trolley 7 relative to the frame 15, more specifically from an aisle 6 in the direction of a storage position and back. During the forward movement, the arms also make an upward movement, so that a product container can be picked up from a storage position 4.

The trolley 7 has four longitudinal running wheels 17 for movement in the transverse direction and four driven transverse running wheels 18 (only two of which are shown in FIGS. 2*a* and 2*b*) oriented transversely to the longitudinal running wheels 17 for movement in the transverse direction. Two opposite longitudinal running wheels 17 as well as two opposite transverse running wheels 18 can be driven by an electric motor with which the trolley 7 is fitted. This electric motor, when actuated, drives the drivable longitudinal running wheels 17 and the transverse running wheels 18 simultaneously. The axes of rotation of the running wheels 17, 18 are horizontally oriented. The trolley 7 further comprises three guide means configured as non-driven guide wheels 19 at, seen in top plan view, three of the four corner points of the trolley 7. The guide wheels 19 have vertical axes of rotation. One of the guide wheels 19 is not shown in FIGS. 2*a* and 2*b*.

Figure 5A:
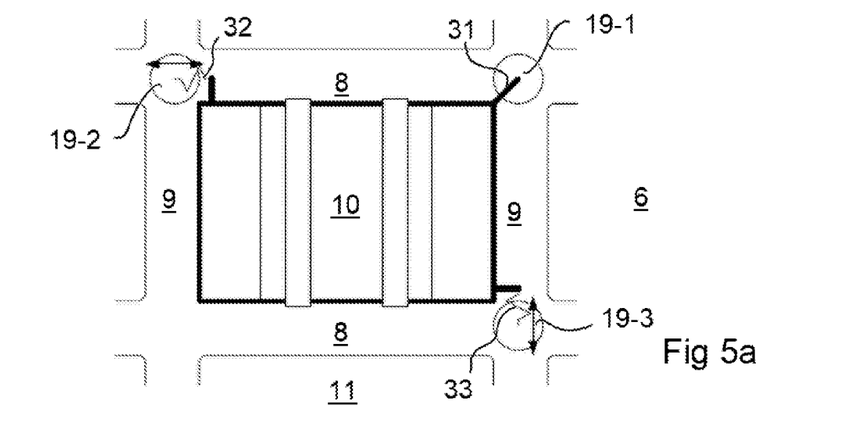
FIGS. 5a, 5b and 5c are schematic top plan views of the trolley at a crossing, moving in transverse direction and moving in longitudinal direction, respectively.
Figure 5B:
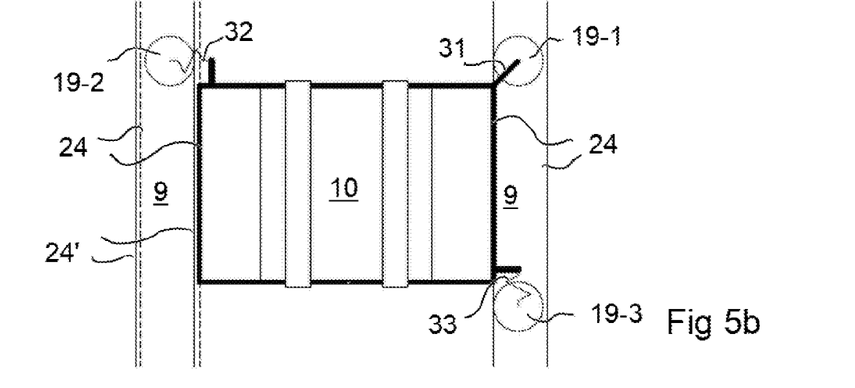
Figure 5C:
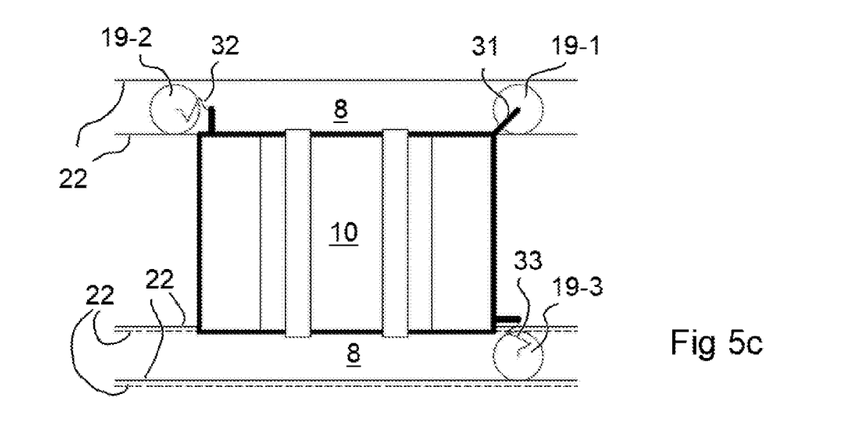

FIGS. 5*a*-5*c* also show guide wheels 19, in these figures indicated by numerals 19-1, 19-2 and 19-3. The guide wheel 19-1 is rigidly connected to the base frame 15 via a connection 31. The guide wheels 19-2 and 19-3, on the other hand, are connected to the base frame 15 via spring members 32 and 33. The spring member 32 acts in longitudinal direction, parallel to the longitudinal guide members 8, whilst the spring member 33 acts perpendicular thereto, parallel to the transverse guide members 9. The use of the spring members 32 and 33 makes it possible to allow relatively large tolerances as regards the distance between opposite guide members 8 or 9. The spring member 32 is unloaded if the centre-to-centre distance between the guide wheels 19-1 and 19-2 equals the nominal centre-to-centre distance between the transverse guide members 9. Reference numeral 24' in FIG. 5*b* schematically indicates, for the transverse position, the situation where the actual position of the left-hand transverse guide member 9 is different from the nominal position. The actual centre-to-centre distance between the longitudinal guide members 9 has thus become larger than the nominal distance. As a result, the spring member 32 is loaded in tension, as a result of which guiding contact between the guide wheels 19-1 and 19-2 on the one hand and the inner sides of the inner transverse guide surfaces 24 on the other hand remains ensured. FIG. 5*c* shows the comparable situation for the longitudinal position. The spring member 33 is unloaded if the centre-to-centre distance between the guide wheels 19-1 and 90-3 equals the nominal centre-to-centre distance between the longitudinal guide members 8. Reference numeral 22' in FIG. 5*c* schematically indicates the situation where the actual position of the lower (in the figure) longitudinal guide member 8 is different from the nominal position. In this example the actual centre-to-centre distance between the transverse guide members 8 has thus become smaller than the nominal distance. As a result, the spring member 33 is loaded in compression, so that guiding contact between the guide wheels 19-1 and 19-3 on the one hand and the inner sides of the outer longitudinal surfaces 24 on the other and remains ensured.

Like the guide wheel 19-1, the longitudinal running wheels 17 are rigidly rotatably mounted in the base frame 15 of the trolley 7 at a fixed position. The transverse running wheels 18 are rotatably mounted in one of two subframes 20 (see also FIGS. 3*a* and 3*b*) provided on opposite sides of the trolley 7. The subframes 20 are capable of rectilinear reciprocating movement relative to the base frame 15 by means of slide guides. The trolley 7 is for that purpose provided with two electric motors. The range of the movement is such that the bottom side of the transverse running wheels 18 is located lower than the bottom sides of the longitudinal running wheels in a lower position of the subframes 20 and higher than the bottom sides of the longitudinal running wheels 17 in an upper position. In the lower position, the trolley is in the transverse position. In the upper position, the trolley is in the longitudinal position.

With reference to FIGS. 2*a* and 2*b*, the longitudinal guide members 8 have a U-shaped cross-section, with the open side of the U-shape facing upward. The U-shape can be considered to be built up of a horizontal central longitudinal running surface 21 and upright longitudinal guide surfaces 22 connecting thereto. Upon movement of the trolley 7 in the longitudinal direction, the longitudinal running wheels 17 roll over the longitudinal running surfaces 21 without making contact with the longitudinal guide surfaces 22, at least during normal operation. In this respect the longitudinal running wheels 17 may be narrower than shown in the figures. The width of the longitudinal running wheels 17 (and of the transverse running wheels 18) may for example amount to about half the distance between the opposite longitudinal guide surfaces 22. During the aforesaid movement, there is guiding cooperation between the longitudinal guide surfaces 22 and the guide wheels 19. In case of a calamity, on the other hand, there may be contact between the longitudinal running wheels 17 and the longitudinal guide surfaces 22.

Like the longitudinal guide members 8, the transverse guide members 9 have a U-shaped cross-section or at least comprise a U-shaped part. Similar to the U-shape of the longitudinal guide members 8, the U-shape of the transverse guide members 9 may be considered to be built up of a horizontal central transverse running surface 23 and upright transverse guide surfaces 24 connecting thereto. During movement of a trolley 7 in transverse direction, the transverse running wheels 18 run over the transverse running surfaces 23 without making contact with the transverse guide surfaces 24. During the aforesaid movement there is guiding cooperation between the transverse guide surfaces 24 and the guide wheels 19.

The U-shape of the transverse guide members 9 extends at the same vertical level as the U-shape of the longitudinal guide members 8. Where individual longitudinal guide members 8 and transverse guide members 9 intersect, the longitudinal guide surfaces 22 and the transverse guide surfaces 24 are interrupted. These interruptions make it possible for the longitudinal running wheels 17 to run over the entire length of the longitudinal running surfaces 21 and for the transverse running wheels 18 to roll over the entire length of the transverse running surfaces 23.

Furthermore, recesses 25 are provided in the longitudinal guide surfaces 22, at the upper sides thereof, in the path of the longitudinal running wheels 17 upon movement of the trolley 7. The recesses 25 extend over 14.5 mm, for example, or in other words, over about 66% of the height of 22 mm of the longitudinal guide surfaces 22, and essentially follow this shape of the lower part of the longitudinal running wheels 17. In the transverse position (see FIGS. 2b, 3b and 4b), the bottom sides of the longitudinal running wheels 17 are located just above the bottom sides of the recesses 25 and below the upper sides of the longitudinal guide surfaces, more specifically below the upper edges of the longitudinal guide surfaces 22. Consequently, lower parts of the longitudinal running wheels 17 move through the recesses 25 during movement of the trolley 7. Furthermore the bottom sides of the guide wheels 19 are located below the bottom sides of the recesses 25 in the longitudinal position. As a result, there may nevertheless be guiding contact between the guide wheels 19 and the longitudinal guide surfaces upon movement of the trolley 7 in the longitudinal direction, also when the guide wheels 19 move past the recesses 25.

The trolleys 7 are further each provided with trolley control means and energy supply means. The energy supply means preferably consist of batteries or so-called super caps. The energy supply means are charged at specific locations in the system by contactless energy transfer and/or by means of finger type contacts. The trolley control means can wirelessly receive and send signals for exchanging information with a central control unit of the system 1.

Now the manner in which a change of conveying direction at the crossing 10 takes place will be discussed with reference to FIGS. 2a-4b. Said figures show the same position for a trolley 7. FIG. 2a shows a trolley 7 which has approached the crossing 10 in the longitudinal direction and has stopped in the middle of the junction, such that the guide wheels 19 are located in points of intersection of longitudinal guide members 8 and transverse guide members 9. The trolley is in the longitudinal position. From that position, the trolley 7 could continue its movement in the longitudinal direction. The subframes 20, and thus the transverse running wheels 18, are in the upper position and thus do not make contact with the transverse running surfaces 23. The trolley 7 is supported on the longitudinal running surfaces 21 via the longitudinal running wheels 17. In the aforesaid upper position, the bottom sides of the transverse running wheels 18 extend above the upper sides of the transverse guide surfaces 24 (and, incidentally, also of the longitudinal guide surfaces 22), for example by 6 mm. The trolley 7 can thus move in the longitudinal direction without the transverse running wheels 18 making contact with a transverse guide.

If the trolley 7 must change its direction at the crossing 10, the subframes 21 will now be moved from the upper position shown in FIG. 2a to the lower position shown in FIG. 2b. During the first part of this movement, the longitudinal running wheels 17 remain supported on the longitudinal surfaces 21 until the transverse running wheels 18 make contact with the transverse running surfaces 23. From that moment the trolley 7 is lifted and the longitudinal running wheels 17 come clear of the longitudinal running surfaces 21. The total height of the trolley 7 increases during said lifting. The aforesaid movement is continued until the bottom sides of the longitudinal running wheels 17 extend above the bottom sides of the recesses 25 by a few mm, for example 4 mm, in the lower position of the transverse running wheels 18. The trolley 7 is now in the transverse position. In said lower position of the transverse running wheels 18, the bottom sides of the longitudinal running wheels 17 are located below the upper sides of the longitudinal surfaces 22. It is further noted that the upper sides of the guide wheels 19 extend above the longitudinal guide surfaces 22 and transverse guide surfaces 24 in the transverse position of the trolley 7, but that the guide wheels 19 are still largely located within the height of the longitudinal guide surfaces 22 and the transverse guide surfaces 24. It is further important to note that the trolley 7 as a whole has its maximum height in the lower position of the transverse running wheels 18. This height is a determining factor in dimensioning the distance between the superimposed layers of rows of the system 1. Upon actuation of the electric motor that is provided for driving the driven longitudinal running wheels 17 and transverse running wheels 18, the trolley 7 will move in the transverse direction, during which movement the lower part of the longitudinal running wheels 17 move through the recesses 25. If the longitudinal guide surfaces 22 would not be provided with recesses 25, movement of the trolley 7 in the transverse direction would only be possible after the vertical adjustment means would have moved the transverse running wheels even further downward until the bottom sides of the longitudinal running wheels 17 would be located above the upper sides of the longitudinal guide surfaces 22. In such a position the total height of the trolley 7 would have become greater, as a consequence of which a greater distance between the superimposed layers of rows of the system 1 would have to be chosen in the design of the system 1. Because the recesses 25 do not extend over the entire height of the longitudinal guide surfaces 22, the longitudinal guide surfaces 22 will nevertheless be able to perform a guiding function for the longitudinal running wheels 17 in the case of a calamity, also at the location of the recesses 25.

Figure 3A:
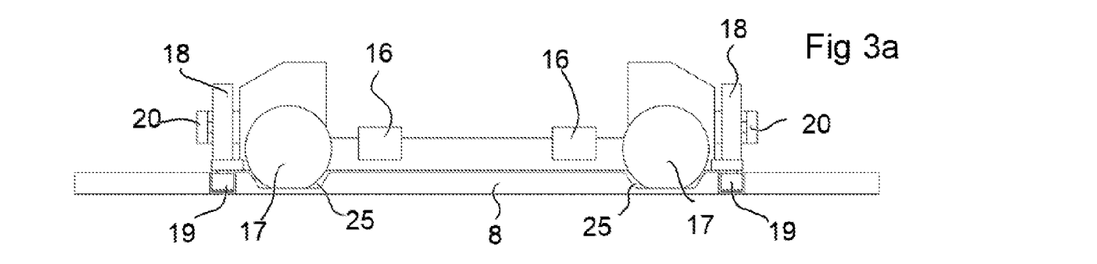
FIGS. 3a and 3b show FIGS. 2a and 2b, respectively, in perpendicular horizontal view parallel to the transverse direction.
Figure 3B:
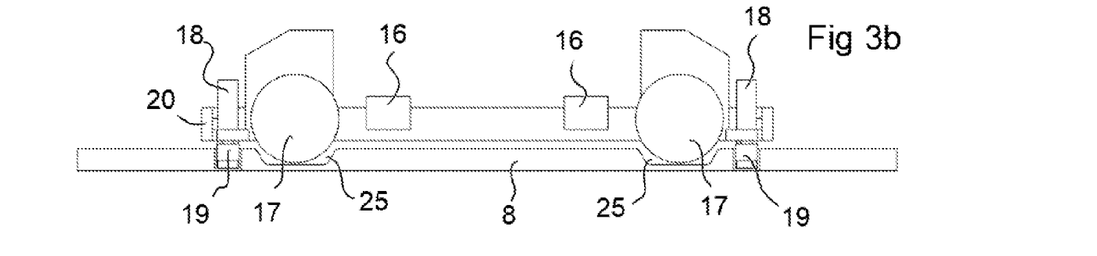
Figure 4A:
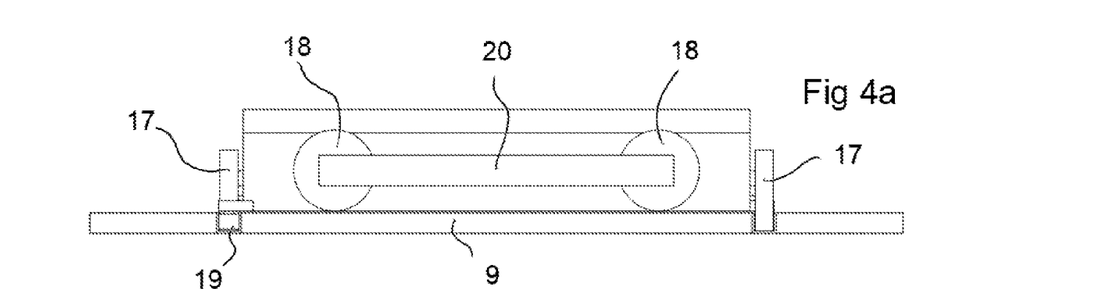
FIGS. 4a and 4b show FIGS. 2a and 2b, respectively, in perpendicular horizontal view parallel to the longitudinal direction.
Figure 4B:
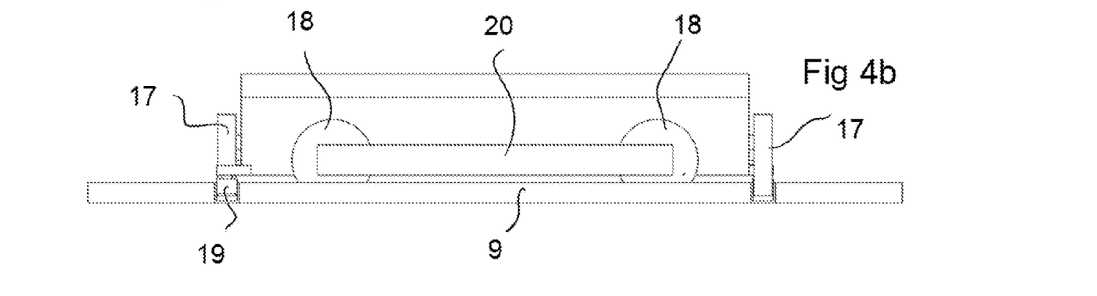

As appears upon comparison of FIGS. 3a, 4a on the one hand and FIGS. 3b, 4b on the other hand, the guide wheels 19 remain partially within the height of the longitudinal guide surfaces 22 and the transverse guide surfaces 24 of the subframes 20 and the transverse running wheels 18.

Because of the fact that the running surfaces 21 and 23 continue also at the locations where longitudinal guide members 8 and transverse guide members 9 intersect, or in other words, are not interrupted, the trolley can pass junctions, such as the crossings 10, at maximum speed both during movement in transverse direction and during movement in longitudinal direction.

In the foregoing the invention has been explained by means of a description of a possible embodiment of the invention. Other embodiments are also conceivable within the scope of the invention. By way of illustration reference is made as a starting point to a storage system as described above, in which, however, a single recess is present between the two transverse guides 9 for each longitudinal guide surface 22, which recess extends at least over the distance between the two longitudinal running wheels 17 on the right-hand side in FIG. 2a, so that these two longitudinal running wheels 17 (and also the other two longitudinal running wheels 17, of course) can pass through the same recesses. In yet another embodiment, no recesses 25 are provided, either, and the height of the longitudinal guide surfaces 22 is lower than the height of the transverse guide surfaces 24 over the entire length.

The invention claimed is:

1. A system for storing product containers, comprising a plurality of parallel racks, each rack comprising superimposed rows of side-by-side storage positions for product containers, a guide system comprising horizontal longitudinal guides extending between rows of adjacent racks and horizontal transverse guides extending in a transverse direction, transversely to the longitudinal guides, and junctions at positions where at least one longitudinal guide and at least one transverse guide join one another, the longitudinal guides comprising pairs of parallel longitudinal guide members each having a longitudinal running surface, and the transverse guides comprising pairs of parallel transverse guide members each having a transverse running surface, wherein the longitudinal running surfaces and the transverse running surfaces lie at the same level, the system further comprising trolleys movable along the guide system, the trolleys each comprising a frame, longitudinal running wheels that roll over the longitudinal running surfaces during movement in the longitudinal direction, transverse running wheels oriented transversely to the longitudinal running wheels, which roll over the transverse running surfaces during movement in the transverse direction, driving means for rotatably driving at least some of the longitudinal running wheels and at least some of the transverse running wheels, vertical adjustment means for moving the longitudinal running wheels and the transverse running wheels up and down relative to each other between a longitudinal position, in which the bottom sides of the longitudinal running wheels are located lower than the bottom sides of the transverse running wheels such that the trolley is supported on the longitudinal running surfaces with the longitudinal running wheels in the longitudinal position, and a transverse position, in which the bottom sides of the transverse running wheels are located lower than the bottom sides of the longitudinal running wheels such that the trolley is supported on the transverse running surfaces in the transverse position, and exchange means for transferring a product container to a storage position and taking over a product container from a storage position, wherein at least one longitudinal guide member of each pair of longitudinal guide members comprises at least one longitudinal guide surface and each trolley comprises at least one guide member which, upon movement of the trolley in the longitudinal direction, guidingly cooperates with the at least one longitudinal guide surface, wherein upper sides of the longitudinal guide surfaces are located lower than upper sides of the transverse guide members, at least at the longitudinal positions thereof where the longitudinal running wheels pass the longitudinal guide surfaces in the transverse position of the vertical adjustment means upon movement of the trolley in the transverse direction.

2. The system according to claim 1, wherein the longitudinal guide surfaces comprise recesses at the longitudinal positions at the upper sides of the longitudinal guide surfaces, through which, in the transverse position of the vertical adjustment means, lower parts of the longitudinal running wheels move upon movement of the trolley in the transverse direction.

3. The system according to claim 2, wherein bottom sides of the recesses are located higher than the bottom side of the at least one guide member in the longitudinal position of the vertical adjustment means.

4. The system according to claim 1, wherein each longitudinal guide member comprises longitudinal guide surfaces on opposite sides of the longitudinal running surface.

5. The system according to claim 4, wherein, seen in cross-sectional view, the longitudinal guide surfaces and the longitudinal running surface of each longitudinal guide member define a U-shape.

6. The system according to claim 1, wherein at least one transverse guide member of each pair of transverse guide members comprises at least one transverse guide surface, wherein at least one guide member of a trolley guidingly cooperates with the at least one transverse guide surface upon movement of the trolley in the transverse direction.

7. The system according to claim 6, wherein all the guide members of each trolley are provided only at corners of the trolley, being capable of guiding cooperation both with longitudinal guide surfaces and with transverse guide surfaces.

8. The system according to claim 6, wherein each trolley is provided with three guide members.

9. The system according to claim 6, wherein bottom sides of the transverse running wheels are located higher than upper sides of the transverse guide surfaces in the longitudinal position, wherein upper sides of the transverse running wheels are located lower than an upper side of the associated trolley.

10. The system according to claim 1, wherein a first guide member is connected to the frame via a first spring member and a second guide member is connected to the frame via a second spring member, wherein the first spring member and the second spring member are configured to act in two directions oriented perpendicular to each other.

11. The system according to claim 10, wherein the first guide member and the second guide member are connected to the frame at opposite corner points of the trolley.

12. The system according to claim 10, wherein a third guide member is rigidly connected to the frame.

13. The system according to claim 1, wherein each trolley comprises no more than and no fewer than four longitudinal running wheels and/or no more than and no fewer than four transverse running wheels.

14. The system according to claim 1, wherein the longitudinal running wheels are rotatably connected to the frame at a fixed position, whilst the transverse running wheels are rotatably connected to at least one subframe that can be moved up and down relative to the frame by the vertical adjustment means.

15. The system according to claim 1, wherein the driving means are configured to drive the drivable longitudinal running wheels and the drivable transverse running wheels simultaneously.

16. The system according to claim 1, wherein the driving means comprise a single electric motor for driving both the drivable longitudinal running wheels and the drivable transverse running wheels.

17. The system according to claim 1, wherein the driving means comprise a single electric motor configured both for driving drivable longitudinal running wheels and/or drivable transverse running wheels and for driving the vertical adjustment means.

18. The system according to claim 1, wherein the driving means comprise a single electric motor configured both for driving drivable longitudinal running wheels and/or drivable transverse running wheels and for driving the exchange means.

19. A combination of a guide system and at least one trolley for use in a system according to claim 1.

* * * * *